United States Patent
Shoshi et al.

(12)

(10) Patent No.: US 6,383,625 B1
(45) Date of Patent: May 7, 2002

(54) ANTIFOULING INFRARED SHIELDING FILM AND PROCESS FOR PRODUCING THE SAME

(75) Inventors: Satoru Shoshi, Koshigaya; Yutaka Onozawa, Kawagoe; Shunpei Watanabe, Yono, all of (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/484,908

(22) Filed: Jan. 18, 2000

(30) Foreign Application Priority Data

Jan. 22, 1999 (JP) .............................. 11-014995

(51) Int. Cl.[7] ................................. B32B 5/16
(52) U.S. Cl. ................. 428/327; 428/328; 428/336; 428/337; 428/447; 523/102
(58) Field of Search ................ 428/327, 447, 428/328, 336, 337; 523/102

(56) References Cited

U.S. PATENT DOCUMENTS

| 4,421,904 A | * 12/1983 | Eckberg et al. ............... 528/27 |
| 5,783,631 A | * 7/1998 | Venkataswamy .......... 525/92 F |
| 6,103,370 A | * 8/2000 | Onozawa et al. ........... 428/354 |
| 6,221,498 B1 | * 4/2001 | Takahama et al. .......... 428/447 |

FOREIGN PATENT DOCUMENTS

| EP | 795 565 | 9/1997 |
| JP | 57-59748 | 4/1982 |
| JP | 57-59749 | 4/1982 |
| JP | 7-100996 | 4/1995 |
| JP | 8-281860 | 10/1996 |
| JP | 9-108621 | 4/1997 |
| JP | 9-156025 | 6/1997 |

* cited by examiner

*Primary Examiner*—Hoa T. Le
(74) *Attorney, Agent, or Firm*—Frishauf, Holtz, Goodman, Langer & Chick, P.C.

(57) ABSTRACT

An antifouling infrared shielding film comprising a transparent substrate film having, on one face thereof, at least an infrared shielding layer which comprises a cured product of a coating layer comprising (A) an ionizing radiation curing resin, (B) an infrared absorbent and (C) an ionizing radiation curing silicone resin in an amount of 0.1 to 50 parts by weight per 100 parts by weight of the resin of the ionizing radiation curing resin of (A); and a process for producing an antifouling infrared shielding film comprising coating one face of a transparent substrate film with a coating agent comprising the component (A), the component (B) and the component (C) in an amount of 0.1 to 50 parts by weight per 100 parts by weight of the component (A) to form a coating layer and curing the formed coating layer by irradiation of an ionizing radiation. The film is a highly functional film showing excellent transparency, scratch resistance and antifouling, and having desirable properties with respect of cleaning, slipping and infrared shielding. The film can be advantageously used for attaching to window panes.

18 Claims, No Drawings

ANTIFOULING INFRARED SHIELDING FILM AND PROCESS FOR PRODUCING THE SAME

BACKGROUND OF THE INVENTION

1. Field of the Invention

The present invention relates to a novel antifouling infrared shielding film and a process for producing the film. More particularly, the present invention relates to an antifouling infrared shielding film showing excellent transparency, scratch resistance and antifouling, cleaning, slipping and infrared shielding properties and advantageously used for attaching to window panes and plastic boards for windows and a process for producing the film efficiently.

2. Description of the Related Arts

Plastic films have been used as films attached to window panes and plastic boards for windows for various purposes.

The sun light coming into a room through a window pane contains ultraviolet light and infrared light in addition to visible light. Ultraviolet light contained in the sun light causes sunburn and adverse effects of the ultraviolet light on human bodies are recently mentioned. It is also well known that ultraviolet light causes degradation of packaging materials to deteriorate the contents. Infrared light contained in the sun light causes problems such as an increase in the room temperature by the light directly transmitted into the room to reduce the efficiency of air conditioning during the summer time. To prevent these undesirable phenomena, ultraviolet shielding films and infrared shielding films are attached to window panes and plastic boards for windows.

It is also generally practiced that films for preventing sight from the outside are attached to window panes and plastic boards for windows so that watching the inside of a room from the outside is made difficult. Films for preventing scattering of fragments are attached to window panes to prevent scattering of fragments of glass fractured in a disaster such as earthquake. The ultraviolet shielding films, the infrared shielding films and the films for preventing sight from the outside described above also exhibit the effect of preventing scattering of fragments.

The above films attached to window panes and plastic boards for windows (hereinafter, occasionally referred to as window films) generally have a hard coat layer on the face thereof to provide the films with scratch resistance. The hard coat layer is formed by coating the face of the film with a resin of the ionizing radiation curing type such as a polyester acrylate resin, an epoxy acrylate resin, a urethane acrylate resin and a polyol acrylate resin and curing the resin.

Methods for providing windows of buildings, vehicles and refrigerated or freezing showcases with the property to reflect or absorb the heating radiation (infrared light) have been proposed to reduce heat and to save energy. For example, methods of attaching films for reflection of heating radiation to windows have been proposed, in which the films have thin films of metals such as aluminum, silver and gold formed on the surface of transparent film substrates in accordance with the sputtering process or the vapor deposition process, (Japanese Patent Application Laid-Open Nos. Showa 57(1982)-59748 and Showa 57(1982)-59749).

However, the thin films formed in accordance with the sputtering process or the vapor deposition process have drawbacks in that transparency is poor to cause poor transmittance of visible lights through window panes when the films are attached to window panes, that the films give reflection with metallic gloss to cause undesirable appearance and that cost of production increases although these films have an excellent property for shielding heating radiation.

Recently, to improve the above drawbacks, various infrared shielding films having an infrared shielding layer which comprises inorganic or organic infrared absorbents and is disposed on a substrate film have been proposed (for example, Japanese Patent Application Laid-Open Nos. Heisei 7(1995)-100996, Heisei 8(1996)-281860, Heisei 9(1997)-108621 and Heisei 9(1997)-156025).

The above infrared shielding films show excellent transparency and infrared shielding property and are useful as films attached to window panes of buildings and vehicles. However, more advanced performances are recently required for various products. Highly functional films having excellent scratch resistance, antifouling property which shows suppressed adsorption of dusts, cleaning property which shows easy removal of dusts and slipping property (in particular for films attached to windows of automobiles) in addition to excellent transparency and infrared shielding property are required as the films attached to window panes. No conventional infrared shielding films can satisfy all these requirements. Development of an infrared shielding film satisfying all these requirements have been desired.

SUMMARY OF THE INVENTION

An object of the present invention is to provide a highly functional antifouling infrared shielding film which shows excellent transparency, scratch resistance and antifouling, cleaning, slipping and infrared shielding properties and is advantageously used for attaching to window panes and plastic boards for windows and a process for producing the film.

As the result of intensive studies by the present inventors to develop an antifouling infrared shielding film showing the above excellent properties, it was found that the above object can be achieved by a film obtained by coating one face of a transparent substrate film with a coating fluid comprising a resin of the ionizing radiation curing type, an infrared absorbent and a silicone resin of the ionizing radiation curing type in a specific relative amount to form a coating layer and then curing the formed coating layer by irradiation of ionizing radiation to form an infrared shielding layer. The present invention has been completed on the basis of this knowledge.

The present invention provides:

(1) An antifouling infrared shielding film comprising a transparent substrate film having, on one face thereof, at least an infrared shielding layer which comprises a cured product of a coating layer comprising (A) a resin of an ionizing radiation curing type, (B) an infrared absorbent and (C) a silicone resin of an ionizing radiation curing type in an amount of 0.1 to 50 part by weight per 100 parts by weight of the resin of an ionizing radiation curing type;

(2) A film described in (1), wherein the infrared absorbent of component (B) is an inorganic infrared absorbent;

(3) A film described in any of (1) and (2), wherein the infrared shielding layer has a thickness of 0.5 to 20 μm; and (4) A process for producing an antifouling infrared shielding film comprising coating one face of a transparent substrate film with a coating agent comprising (A) a resin of an ionizing radiation curing type, (B) an infrared absorbent and (C) a silicone resin of an ionizing radiation curing type in an amount of 0.1 to 50 part by weight per 100 parts by weight of the resin of an ionizing radiation curing type to form a coating layer and curing the formed coating layer by irradiation of an ionizing radiation.

DESCRIPTION OF THE PREFERRED EMBODIMENTS

The transparent substrate film used for the antifouling infrared shielding film of the present invention is not particularly limited and a suitable film can be selected from various types of transparent plastic films in accordance with the situation. Examples of the transparent plastic film include films of polyolefin resins such as polyethylene, polypropylene, poly-4-methylpentene-1 and polybutene-1; polyester resins such as polyethylene terephthalate and polyethylene naphthalate; polycarbonate resins; polyvinyl chloride resins; polyphenylene sulfide resins; polyether sulfone resins; polyethylene sulfide resins; polyphenylene ether resins; styrene resins; acrylic resins; polyamide resins; polyimide resins and cellulose resins such as cellulose acetate; and laminate films of these films. Among these films, films of polyethylene terephthalate are preferable.

The thickness of the transparent substrate film is not particularly limited and can be suitably selected in accordance with the application. The thickness is generally in the range of 5 to 200 $\mu$m and preferably in the range of 10 to 100 $\mu$m.

The transparent substrate film may be colored or may have a vapor deposited layer, where desired. The transparent substrate film may also contain antioxidants and ultraviolet absorbents. One or both surfaces of the transparent substrate film may have an oxidation treatment or may be made rough, where desired, to enhance adhesion of the surfaces to layers formed thereon. Examples of the oxidation treatment include treatments using corona discharge, chromic acid (a wet process), flame, hot air or ozone and ultraviolet light. Examples of the method of making the surface rough include treatments of sand blast and treatments using solvents. The method of the surface treatment can be suitably selected in accordance with the type of the substrate film. In general, the treatment using corona discharge is preferable from the standpoint of the effect and operability.

In the antifouling infrared shielding film of the present invention, at least an infrared shielding layer is formed on one face of the transparent substrate film. The infrared shielding layer comprises a cured product of a coating layer comprising (A) a resin of the ionizing radiation curing type, (B) an infrared absorbent and (C) a silicone resin of the ionizing radiation curing type in an amount of 0.1 to 50 part by weight per 100 parts by weight of the resin of the ionizing radiation curing type.

The resin of the ionizing radiation curing type of component (A) is a resin which is used for forming a hard coat layer having excellent scratch resistance and can be cured by irradiation of ultraviolet light or electron beams. Among various types of resins of the ionizing radiation curing type, resins of the ultraviolet curing type frequently used for forming hard coat layers on films attached to the inner face of window panes are preferable. The resin of the ultraviolet curing type is not particularly limited and can be suitably selected from conventional resins of the ultraviolet curing type. The resin of the ultraviolet curing type generally contains a photopolymerizable prepolymer as the main component and, where desired, photopolymerizable monomers and photopolymerization initiators. The photopolymerizable prepolymer may be a photopolymerizable prepolymer of the radical polymerization type or a photopolymerizable prepolymer of the cation polymerization type. Examples of the photopolymerizable prepolymer of the radical polymerization type include photopolymerizable prepolymers of the polyester acrylate type, the epoxy acrylate type, the urethane acrylate type and the polyol acrylate type. The photopolymerizable prepolymer of the polyester acrylate type can be obtained, for example, by condensation of a polybasic carboxylic acid with a polyhydric alcohol to obtain a polyester oligomer having hydroxyl groups at both ends, followed by esterification of the hydroxyl groups in the obtained polyester oligomer with (meth)acrylic acid; or by addition of an alkylene oxide to a polybasic carboxylic acid to obtain an oligomer, followed by esterification of the hydroxyl groups in the obtained oligomer with (meth)acrylic acid. The photopolymerizable prepolymer of the epoxy acrylate type can be obtained, for example, by reaction of the oxirane ring in an epoxy resin of the bisphenol type or the novolak type having a relatively low molecular weight with (meth)acrylic acid for esterification. The photopolymerizable prepolymer of the urethane acrylate type can be obtained, for example, by reaction of a polyether polyol or a polyester polyol with a polyisocyanate to obtain a polyurethane oligomer, followed by esterification of the obtained polyurethane oligomer with (meth)acrylic acid. The photopolymerizable prepolymer of the polyol acrylate type can be obtained, for example, by esterification of hydroxyl groups in a polyether polyol with (meth)acrylate. A single type or a combination of two or more types of the photopolymerizable prepolymer may be used.

As the photopolymerizable prepolymer of the cation polymerization type, epoxy resins are generally used. Examples of the epoxy resin include compounds obtained by epoxidation of polyhydric phenols such as bisphenol resins and novolak resins with epichlorohydrin or the like and compounds obtained by oxidation of linear olefin compounds or cyclic olefin compounds with peroxides or the like.

Examples of the photopolymerizable monomer include 1,4-butanediol di(meth)acrylate, 1,6-hexanediol di(meth) acrylate, neopentyl glycol di(meth)acrylate, polyethylene glycol di(meth)acrylate, neopentyl glycol adipate di(meth) acrylate, neopentyl glycol hydroxypivalate di(meth) acrylate, dicyclopentanyl di(meth)acrylate, dicylopentenyl di(meth)acrylate modified with caprolactone, phosphoric acid di(meth)acrylate modified with ethylene oxide, cyclohexyl di(meth)acrylate modified with allyl group, isocyanurate di(meth)acrylate, trimethylolpropane tri(meth)acrylate, dipentaerythritol tri(meth)acrylate, dipentaerythritol tri (meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth) acrylate and dipentaerythritol hexa(meth)acrylate modified with caprolactone. A single type or a combination of two or more types of the photopolymerizable monomer may be used. The amount of the photopolymerizable monomer is generally 0 to 40 parts by weight and preferably 4 to 20 parts by weight per 100 parts by weight of the photopolymerizable prepolymer.

Examples of the photopolymerization initiator used for the photopolymerizable prepolymer of the radical polymerization type include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholinopropane-1-one, 4-(2-hydroxyethoxy)phenyl 2-hydroxy-2-propyl ketone, benzophenone, p-phenylbenzophenone, 4,4'-diethylaminobenzophenone, dichlorobenzophenone, 2-methyl-anthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylamine benzoate. Examples of the photopolymerization initiator for the photopolymerizable prepolymer of the cationic polymerization type include compounds comprising combinations of oniums such as aromatic sulfonium ions, aromatic oxosulfonium ions and aromatic iodonium ions and anions such as tetrafluoroborate ion, hexafluorophosphate ion, hexafluoroantimonate ion and hexafluoroarsenate ion. A single type or a combination of two or more types of the photopolymerization initiator may be used. The amount of the photopolymerization initiator is generally selected in the range of 0.2 to 10 parts by weight per 100 parts by weight of the photopolymerizable prepolymer.

The infrared absorbents used as component (B) can be divided into organic infrared absorbents and inorganic infrared absorbents. Examples of the organic infrared absorbent include cyanine compounds, squalylium compounds, thiol nickel complex compounds, phthalocyanine compounds, triallylmethane compounds, naphthoquinone compounds, anthraquinone compounds and amino compounds such as N,N,N',N'-tetrakis(p-di-n-butylaminophenyl)-p-phenylenediaminium perchlorate, phenylenediaminium chlorate, phenylenediaminium hexafluoroantimonate, phenylenediaminium fluoroborate, phenylenediaminium fluorate and phenylenediaminium perchlorate.

Examples of the inorganic infrared absorbent include titanium oxide, zinc oxide, indium oxide, tin oxide and zinc sulfide. Metal oxides such as tin oxide, ATO (tin oxide doped with antimony) and ITO (indium oxide doped with tin) are preferable. It is preferable that the inorganic infrared absorbent has a particle diameter of 0.5 $\mu$m or less and more preferably 0.1 $\mu$m or less so that a coating layer showing smaller absorption of light in the visible region and excellent transparency is formed.

Although the absorbents exhibit the infrared shielding effect with use in small amounts, the organic infrared absorbents have drawbacks in that light resistance is inferior and that the absorbents are easily colored. Therefore, the inorganic infrared absorbents are preferable from the standpoint of practical application.

In the present invention, a single type or a combination of two or more types of the organic infrared absorbent may be used and a single type or a combination of two or more types of the inorganic infrared absorbent may also be used. A combination of one or more types of the organic infrared absorbent and one or more types of the inorganic infrared absorbent may also be used.

The amount of the infrared absorbent is selected in a range such that the desired infrared shielding effect can be exhibited and other properties such as transparency, scratch resistance, the antifouling property, the cleaning property and the slipping property are not adversely affected. When an organic infrared absorbent is used, the amount of the organic infrared absorbent is generally in the range of 0.1 to 15 parts by weight and preferably in the range of 0.5 to 10 parts by weight per 100 parts by weight of the resin of the ionizing radiation curing type of component (A). When an inorganic infrared absorbent is used, the amount of the inorganic infrared absorbent is generally in the range of 30 to 500 parts by weight and preferably in the range of 50 to 300 parts by weight per 100 parts by weight of the resin of the ionizing radiation curing type of component (A). The inorganic infrared absorbents such as ATO and ITO generally show electric conductivity. Therefore, the antistatic property is provided in addition to the infrared shielding property when such inorganic infrared absorbents are used.

As the silicone resin of the ionizing radiation curing type of component (C), silicone resins of the ultraviolet curing type are preferable. Examples of such resins include silicone resins of the radical addition type having an alkenyl group and mercapto group in the molecule, silicone resins of the hydrosilylation reaction type having an alkenyl group and hydrogen atom in the molecule, silicone resins of the cationic polymerization type having epoxy group in the molecule and silicone resins of the radical polymerization type having (meth)acrylic group in the molecule. Among these silicone resins, the silicone resins of the cationic polymerization type having epoxy group in the molecule and the silicone resins of the radical polymerization type having (meth)acrylic group in the molecule are preferable.

Examples of the silicone resin having epoxy group or (meth)acrylic group in the molecule include polydimethylsiloxane having epoxypropoxypropyl groups at the ends, copolymers of (epoxycyclohexylethyl)methylsiloxane and dimethylsiloxane, polydimethylsiloxane having methacryloxypropyl groups at the ends and polydimethylsiloxane having acryloxypropyl groups at the ends.

Examples of the silicone resin having vinyl group in the molecule include polydimethylsiloxane having vinyl groups at the ends and homopolymer of vinylmethylsiloxane.

In the present invention, a single type or a combination of two or more types of the silicone resin of the ionizing radiation curing type of component (C) may be used. The amount of the silicone resin of the ionizing radiation curing type is selected in the range of 0.1 to 50 parts by weight per 100 parts by weight of the resin of the ionizing radiation curing type of component (A). When the amount is less than 0.1 part by weight, the antifouling property, the cleaning property and the slipping property are not sufficiently provided. When the amount exceeds 50 parts by weight, the curing property and scratch resistance deteriorate. When the antifouling property, the cleaning property, the slipping property, the curing property and scratch resistance are taken into consideration, the amount of component (C) is preferably in the range of 0.5 to 30 parts by weight and more preferably in the range of 1 to 20 parts by weight.

When the above reactive silicone resin is used, the silicone resin is crosslinked in itself by the curing reaction. Moreover, the silicone resin and the resin of the ionizing radiation curing type of component (A) are occasionally crosslinked together. Therefore, bleeding out of the silicone resin with time is suppressed and the functions provided by the silicone resin are maintained for a long time.

The infrared shielding layer in the present invention involves a cured product of a coating layer comprising component (A), component (B) and component (C) described above. The infrared shielding layer may further comprise ultraviolet absorbents, light stabilizers, antioxidants, inorganic fillers and coloring agents, where desired, within a range such that the object of the present invention is not adversely affected.

The thickness of the infrared shielding layer is selected generally in the range of 0.5 to 20 μm and preferably in the range of 1 to 15 μm.

The infrared shielding layer can be formed efficiently in accordance with the following process of the present invention.

In the process of the present invention, component (A), component (B) and component (C) described above and various additives used where desired (including polymerization initiators) are added to a solvent which is used where necessary and dispersed or dissolved in the solvent to prepare a homogeneous coating agent.

Examples of the solvent include aliphatic hydrocarbons such as hexane, heptane and cyclohexane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanone and isophorone; esters such as ethyl acetate and butyl acetate; and cellosolve solvents such as ethylcellosolve. When an inorganic infrared absorbent is used, a dispersant may be used to obtain a homogeneous dispersion and the dispersion can be prepared using a disperser such as a sand mill, an attritor, a colloid mill, a ball mill and a high pressure homogenizer. Examples of the dispersant include anionic surfactants such as salts of carboxylic acids, salts of sulfonic acids, ester salts of sulfuric acid, esters of phosphoric acid and salts of phosphonic acid and nonionic surfactants such as polyoxyethylene alkyl ethers, polyoxyethylene alkylphenol ethers, polyoxyethylene alkyl esters and sorbitan alkyl esters.

Concentration and viscosity of the prepared coating agent is not particularly limited as long as the coating can be performed and can be suitably selected in accordance with the situation.

The above coating agent is applied to one face of the transparent substrate film in accordance with a conventional process such as bar coating, knife coating, roll coating, blade coating, die coating and gravure coating to form a coating layer. The coating layer is then dried and cured by irradiation of an ionizing radiation to form the infrared shielding layer.

Examples of the ionizing radiation include ultraviolet light and electron beams. The ultraviolet light can be obtained from a high pressure mercury lamp, a fusion H lamp or a xenon lamp. The electron beams can be obtained from an electron accelerator. Among the ionizing radiations, ultraviolet light is preferable. When electron beams are used, the cured film can be obtained without using a polymerization initiator.

In the present invention, a layer of a primer may be formed between the infrared shielding layer and the substrate film to enhance adhesion between the infrared shielding layer and the substrate film. The primer is not particularly limited and a conventional primer such as an acrylic primer, a polyester primer, a polyurethane primer, a silicone primer or a rubber primer can be used. From the standpoint of durability and adhesion, an acrylic primer and a polyester primer are preferable. The primer may comprise ultraviolet absorbents and light stabilizers where necessary. The thickness of the primer is preferably in the range of 0.1 to 10 μm and more preferably in the range of 0.5 to 5 μm from the standpoint of homogeneous coating and tight adhesion.

In the antifouling infrared shielding film of the present invention, a release liner may be disposed on the face of the transparent substrate film opposite to the face having the infrared shielding layer via an adhesive layer, where desired.

The adhesive material forming the adhesive layer is not particularly limited and a suitable adhesive may be selected from various conventional adhesive in accordance with the situation. Acrylic adhesives, urethane adhesives and silicone adhesives are preferable from the standpoint of weatherability. The thickness of the adhesive layer is generally in the range of 5 to 100 μm and preferably in the range of 10 to 60 μm.

Examples of the release liner disposed on the above adhesive layer include sheets obtained by paper such as glassine paper, coated paper and laminate paper and various plastic films with releasing agents such as silicone resins. The thickness of the release sheet is not particularly limited and generally about 20 to 150 μm. The above adhesive layer may contain ultraviolet absorbents and light stabilizers where necessary.

The antifouling infrared shielding film of the present invention is advantageously used as a film attached to the inner face of window panes and plastic boards for windows. When the film is used, the release sheet is removed and the remaining film is attached in a manner such that the adhesive layer is attached to the object article.

To summarize the advantages obtained by the present invention, the antifouling infrared shielding film of the present invention is a functional film showing excellent transparency, scratch resistance and antifouling, cleaning, slipping and infrared shielding properties and advantageously used for attaching to window panes and plastic boards for windows.

EXAMPLES

The present invention will be described more specifically with reference to examples in the following. However, the present invention is not limited to the examples.

Physical properties of the infrared shielding films prepared in the examples were evaluated in accordance with the following methods.

(1) Total Light Transmittance and Haze

The total light transmittance and the haze were evaluated in accordance with the method of Japanese Industrial Standard K 7105 using a haze meter manufactured by NIPPON DENSHOKU KOGYO Co., Ltd.

(2) Transmittance of Light of 960 nm

The transmittance of light of 960 nm was measured using a spectrophotometer manufactured by SHIMADZU Corporation.

(3) Pencil Hardness

The pencil hardness was measured in accordance with the method of Japanese Industrial Standard K 5400 using a pencil scratch tester manufactured by TOYO SEIKI Co., Ltd.

(4) Attachment of Ash

A test piece of 10 cm$^2$ was rubbed with a gauze in 20 reciprocal movements and then brought close to ash of a cigarette. After the test piece was brought at a position 2 mm above the ash, the test piece was examined with respect to attachment of the ash. The result of the examination was evaluated as follows: 5 when no attachment was found; 1 when attachment was found in a great amount; 2 to 4 when attachment was found in an intermediate amount; and the smaller the number, the greater the amount.

(5) Contact Angle

The contact angle of water was measured in accordance with the static drop method using a contact angle meter manufactured by KYOWA INTERFACE SCIENCE Co., Ltd.

(6) Static Friction Coefficient (Slipping Property)

The static friction coefficient was measured in accordance with the method of Japanese Industrial Standard K 7125 using a TENSILON tensile tester.

Example 1

A resin of the ultraviolet curing type (manufactured by DAINICHI-SEIKA COLOR AND CHEMICALS MFG. Co., Ltd.; trade name: SEIKA-BEAM EXF-01L; a polyester acrylate resin containing a polymerization initiator for radical polymerization) in an amount of 100 parts by weight, 3 parts by weight of a silicone resin of the ultraviolet curing type (manufactured by SHIN-ETSU CHEMICAL Co., Ltd.; trade name: SILICONE X-62-5408; a silicone resin of the cationic polymerization type modified with epoxy group), 0.1 part by weight of a cationic photopolymerization initiator (manufactured by SHIN-ETSU CHEMICAL Co., Ltd.; trade name: CAT-7603), 250 parts by weight of a dispersion of tin oxide doped with about 10% by weight (based on tin oxide) of antimony in toluene (concentration: 30% by weight) (manufactured by ISHIHARA TECHNO Corporation; trade name: GN-100P(toluene)) and 87 parts by weight of isobutanol were mixed together to prepare a homogeneous coating agent having a concentration of the solid components of about 40% by weight.

One face of a polyester film having a thickness of 50 μm (manufactured by TORAY INDUSTRIES Inc.; trade name: LUMIRROR T-70; not treat for adhesion) was coated with the above coating agent by a Mayer bar in a manner such that the coating layer had a thickness of 2.5 μm after being cured. The coating layer was dried at 80° C. for 1 minutes and then cured by irradiation of ultraviolet light (the amount of light: 250 mJ/cm$^2$) using an apparatus for irradiation of ultraviolet light (manufactured by EYE GRAPHICS Co., Ltd.; model No. UB042-5AM-W) to prepare an infrared shielding film. The properties of the prepared infrared shielding film are shown in Table 1.

Example 2

To 100 parts by weight of an epoxy resin of the ultraviolet curing type containing a photopolymerization initiator for cationic polymerization (manufactured by ASAHI DENKA KOGYO K.K.; trade name: ADEKA OPTOMER KR-566NL), 10 parts by weight of the same silicone resin modified with epoxy group as that used in Example 1 (trade name: SILICONE X-62-5408) and 250 parts by weight of a dispersion of tin oxide doped with about 10% by weight (based on tin oxide) of antimony in methyl ethyl ketone (concentration: 30% by weight) (manufactured by ISHIHARA TECHNO Corporation; trade name: SN-100P (MEK)) were added. To the obtained mixture, ethylcellosolve was added in an amount such that the obtained agent had a concentration of the solid components of about 50% by weight. The obtained agent was mixed to prepare a homogeneous coating agent.

An infrared shielding film was prepared in accordance with the same procedures as those conducted in Example 1 using a polyester film having a thickness of 50 μm (manufactured by MITSUBISHI POLYESTER FILM Corporation; trade name: DIAFOIL T-600E; treated for adhesion). The properties of the prepared film are shown in Table 1.

Example 3

An infrared shielding film was prepared in accordance with the same procedures as those conducted in Example 2 except that the amount of the silicone resin of the ultraviolet curing type was changed to 15 parts by weight. The properties of the prepared film are shown in Table 1.

Example 4

An infrared shielding film was prepared in accordance with the same procedures as those conducted in Example 2 except that the amount of the dispersion of tin oxide doped with antimony in methyl ethyl ketone was changed to 500 parts by weight. The properties of the prepared film are shown in Table 1.

Comparative Example 1

An infrared shielding film was prepared in accordance with the same procedures as those conducted in Example 1 except that none of the silicone resin of the ultraviolet curing type and the polymerization initiator for the cationic polymerization were added. The properties of the prepared film are shown in Table 1.

Comparative Example 2

An infrared shielding film was prepared in accordance with the same procedures as those conducted in Example 2 except that the silicone resin of the ultraviolet curing type was not added. The properties of the prepared film are shown in Table 1.

TABLE 1

|  | Example | | | | Comparative Example | |
| --- | --- | --- | --- | --- | --- | --- |
|  | 1 | 2 | 3 | 4 | 1 | 2 |
| Haze (%) | 1.16 | 1.15 | 1.20 | 2.24 | 1.01 | 1.03 |
| Total light transmittance (%) | 86.4 | 86.8 | 86.1 | 82.1 | 87.5 | 86.9 |
| Transmittance of light of 960 nm (%) | 82.5 | 83.1 | 82.8 | 74.3 | 83.0 | 82.9 |
| Pencil hardness | 2H | 2H | H | 2H | 2H | 2H |
| Attachment of ash | 4 | 4 | 4 | 5 | 2 | 1 |
| Contact angle (degree) | 101.7 | 98.4 | 103.5 | 97.3 | 78.5 | 70.2 |
| Static friction coefficient | 0.5 | 0.35 | 0.3 | 0.4 | exceeding measureable range | exceeding measureable range |

What is claimed is:

1. An antifouling infrared shielding film comprising a transparent substrate film having, on one face thereof, at least an infrared shielding layer which comprises a cured product of a coating layer comprising (A) an ionizing radiation curing resin, (B) an infrared absorbent selected from the group consisting of (i) an organic infrared absorbent in an amount of 0.1 to 15 parts by weight per 100 parts by weight of the ionizing radiation curing resin of (A) and (ii) an inorganic infrared absorbent in an amount of 30 to 500 parts by weight per 100 parts by weight of the ionizing radiation curing resin of (A), and (C) an ionizing radiation curing silicone resin in an amount of 0.1 to 50 parts by weight per 100 parts by weight of the ionizing radiation curing resin of (A).

2. A film according to claim 1, wherein the infrared absorbent of component (B) is the inorganic infrared absorbent.

3. A film according to claim 2, wherein the infrared shielding layer has a thickness of 0.5 to 20 $\mu$m.

4. A film according to claim 1, wherein the infrared shielding layer has a thickness of 0.5 to 20 $\mu$m.

5. A film according to claim 1, wherein the transparent substrate film is made of a plastic selected from the group consisting of polyethylene, polypropylene, poly-4-methylpentene-1, polybutene-1, polyethylene terephthalate, polyethylene naphthalate, a polycarbonate resin, a polyvinyl chloride resin, a polyphenylene sulfide resin, a polyether sulfone resin, a polyethylene sulfide resin, a polyphenylene ether resin, a styrene resin, an acrylic resin, a polyamide resin, a polyimide resin and cellulose acetate.

6. A film according to claim 5, wherein the transparent substrate film has a thickness of 5 to 200 $\mu$m.

7. A film according to claim 5, wherein the transparent substrate film is made of polyethylene terephthalate and has a thickness of 10 to 100 $\mu$m.

8. A film according to claim 1, wherein the infrared absorbent is the organic infrared absorbent which is selected from the group consisting of a cyanine compound, a squalylium compound, a thiol nickel complex compound, a phthalocyanine compound, a triallylmethane compound, a naphthoquinone compound, an anthraquinone compound, N,N,N',N'-tetrakis(p-di-n-butylaminophenyl)-p-phenylenediaminium perchlorate, phenylene-diaminium chlorate, phenylenediaminium hexafluoroantimonate, phenylenediaminium fluoroborate, phenylenediaminium fluorate and phenylenediaminium perchlorate.

9. A film according to claim 8, wherein the organic infrared absorbent is in an amount of 0.5 to 10 parts by weight per 100 parts by weight of the ionizing radiation curing resin of (A).

10. A film according to claim 1, wherein the infrared absorbent is the inorganic infrared absorbent which is selected from the group consisting of titanium oxide, zinc oxide, indium oxide, tin oxide, zinc sulfide, tin oxide doped with antimony and indium oxide doped with tin.

11. A film according to claim 10, wherein the inorganic infrared absorbent has a particle diameter of 0.5 $\mu$m or less.

12. A film according to claim 10, wherein the inorganic infrared absorbent has a particle diameter of 0.1 $\mu$m or less.

13. A film according to claim 10, wherein the inorganic infrared absorbent is in an amount of 50 to 300 parts by weight per 100 parts by weight of the ionizing radiation curing resin of (A).

14. A film according to claim 1, wherein the silicone resin of (C) is in an amount of 0.5 to 30 parts by weight per 100 parts by weight of the ionizing curing resin (A).

15. A film according to claim 1, wherein the silicone resin of (C) is in an amount of 1 to 20 parts by weight per 100 parts by weight of the ionizing curing resin of (A).

16. A film according to claim 1, wherein the infrared shielding layer has a thickness of 1 to 15 $\mu$m.

17. A film according to claim 1, wherein the infrared shielding layer has a thickness of 0.5 to 20 $\mu$m and the infrared absorbent of (B) is the inorganic infrared absorbent.

18. A process for producing an antifouling infrared shielding film comprising coating one face of a transparent substrate film with a coating agent comprising (A) an ionizing radiation curing resin, (B) an infrared absorbent selected from the group consisting of (i) an organic infrared absorbent in an amount of 0.1 to 15 parts by weight per 100 parts by weight of the ionizing radiation curing resin of (A) and (ii) an inorganic infrared absorbent in an amount of 30 to 500 parts by weight per 100 parts by weight of the ionizing curing resin of (A), and (C) an ionizing radiation curing silicone resin in an amount of 0.1 to 50 parts by weight per 100 parts by weight of the ionizing radiation curing resin of (A) to form a coating layer and curing the formed coating layer by irradiation of an ionizing radiation.

\* \* \* \* \*